H. Augur,
Carving Wood.
Nº 4,906.   Patented Dec. 23, 1846.
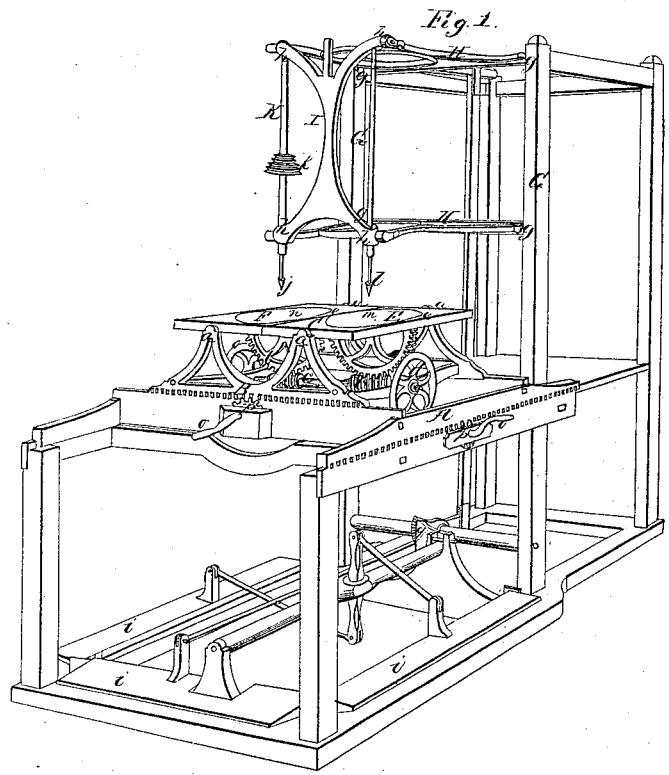
Fig. 1.
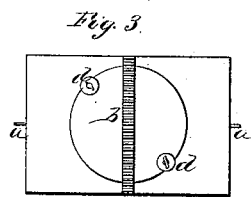
Fig. 3.
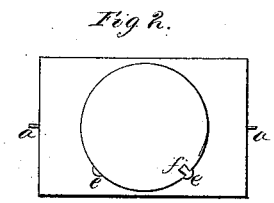
Fig. 2.
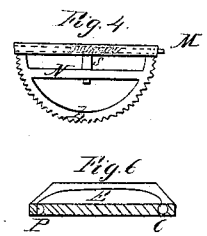
Fig. 4.
Fig. 6.
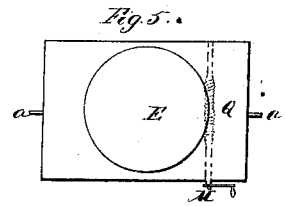
Fig. 5.
AM. PHOTO-LITHO. CO. N.Y. (OSBORNE'S PROCESS)

UNITED STATES PATENT OFFICE.

HEZEKIAH AUGUR, OF NEW HAVEN, CONNECTICUT.

IMPROVEMENT IN MACHINES FOR CARVING.

Specification forming part of Letters Patent No. 4,906, dated December 23, 1846.

*To all whom it may concern:*

Be it known that I, HEZEKIAH AUGUR, of the city and county of New Haven and State of Connecticut, have invented a new and useful Machine for Carving Wood, Stone, and other Material; and I do hereby declare that the following is a full, clear, and exact description of the construction and operation of the same, reference being had to the accompanying drawings, which make part of this specification, in which—

Figure 1 is a perspective view of the whole machine, showing all its parts substantially at one view. Fig. 2 represents the upper or face side of one of the tablets with one form of chuck inserted, to which chuck the pattern or the block or material to be carved is to be fastened. Fig. 3 represents the under or reverse side of the same tablet with the segment of a toothed wheel attached, by which the tablet is to be inclined, and also the thumb-screws by which the chuck is fastened into the tablet while carving the work.

The machine is constructed substantially in the following manner, to wit: The main frame consists of six posts or stiles of convenient length, three on each side, the two front posts being about half the length of the others and all being connected together by sills and beams in a substantial manner. (See Fig. 1.) The front part of the frame (which should be about square) supports two carriages A and B, one above and movable on the other. These two carriages are moved laterally and at right angles with each other by means of toothed wheels and racks, which wheels are worked, by means of cranks or otherwise, by the hands of the workman. To the uppermost of these two carriages B are attached two tablets C and D, each sustained separately in the upper part of the frame of the carriage B by means of a pivot in the center of each end of the tablet. (See $a$, Figs. 1, 2, and 3.) Each of these tablets C and D has attached to its under side a segment of a toothed wheel $b$, Figs. 1 and 3, the teeth of which work into an endless screw $c\ c$, Fig. 1, the two endless screws being on the same arbor or shaft $c\ c$. These endless screws are used to retain or place the tablets in the necessary position, either level or inclined, as may be required for each particular part of the work. In the center of each of these tablets is fitted a chuck made in a circular form, as E and F, Fig. 1, and confined in its place by means of a rabbet in the upper surface of the tablet and by thumb-screws $d\ d$, Fig. 3, acting on the under side or made in any other known form and confined by any other known means, which has been or hereinafter may be used in lathes or other machines, so that the chuck may be inserted or removed with ease and convenience at any time at the option of the workman, and also be best adapted to the work to be performed. The chuck must have a projection or lip $p$, Figs. 1 and 2, on one side that will fit accurately into either of the two notches or cavities $e\ e$, Figs. 1 and 2, and these notches or cavities must be situated ninety degrees from each other, so that the chuck will be turned a quarter of a circle whenever it is shifted. By shifting these chucks in the course of the operation, and by means of the two lateral motions of the carriages at right angles, combined with the operation of the endless screws, (which are worked by hand,) to incline the tablets, the block or material may be carved on its upper surface, on its two sides, and on both ends. Thus the workman can carve five sides of a cubical figure, and consequently all parts (except the bottom) of irregular figures generally by the operation of the machine.

The pattern to be copied, and also the block or material to be carved, must be securely fastened to the chuck by screws, clamps, or some other convenient and substantial means. This can best be done when the chuck is detached from the tablet, and then the chuck can be again inserted into the tablet when wanted.

To the upper part of the first two long posts G G of the main frame is attached a swing or gallows frame H H by means of four pivots $g\ g\ g\ g$, or in any other convenient way, and the four front corners $h\ h\ h\ h$ are made with moving joints, so that the frame H H may be susceptible of a vertical motion when it is necessary for freeing the cutting-tool and guide or for raising the cutting-tool and guide out of the way for the purpose of detaching or inserting the chucks, and also for the purpose of changing the cutting-tool and guide when necessary. This vertical motion is communicated to the frame H H by means of the treadles $i\ i\ i$ and the pitman I, which are connected at $q$, Fig. 1, the pitman I being attached to the back bar r of the frame H H, Fig. 1. The swing or gallows frame H H extends forward, so as to bring the front corners h h h h directly over the center of the tablets C and D when the two carriages A and B are in a central position.

Into one side J of the front of the frame H H is fitted a shaft or stock K of suitable material and strength, into the lower end of which is inserted the cutting-tool j. This shaft or stock must be so fitted as to allow it to have a free rotary motion, and on it must be fitted a pulley k, to which the power to revolve the cutting-tool j with the necessary velocity is to be applied by means of an endless band. Into the other side of the front of the frame H H is fitted a similar shaft L, into the lower end of which is inserted a smooth piece of steel or iron l, shaped in its outlines exactly like the figure described by the cutting-edge of the tool inserted in the other shaft K. This smooth piece of steel or iron l works on the surface of the pattern as at m, Fig. 1, and guides and controls the cutting-tool j, so as to make it cut a perfect copy of the pattern (except in some parts, which must be retouched by hand) as it passes over the block or material to be carved, as seen at n, Fig. 1.

The treadles i i i are so placed as to allow the workman to stand on either of the three sides of the machine, as may be most convenient for doing different parts of the work, and the cranks, &c., o o o o are also placed on both ends of each of the arbors of the wheels p p, which move the two carriages A and B, and also on both ends of the arbor of the two endless screws c c, which incline the tablets for the same convenience.

Figs. 4, 5, and 6 show another mode of attaching the chucks to the tablets and of shifting their positions therein. Fig. 4 is an end view of one of the tablets, showing the chuck as connected with an upright shaft s, which rests in a bar N, joining the two sides of the toothed segment b, preserving its central position, while the rotary motion to shift its position is governed by the operation of an endless screw the shaft of which projects from the tablet at M, which is to be worked by a crank to be applied, when necessary, as seen at M, Fig. 5. Fig. 5 is a view of the top of one of the tablets with the endless screw Q, as seen through the apparently-transparent surface of the tablet and chuck. Fig. 6 is a perspective view of a section of one of the tablets and chucks, showing the aperture O, into which the endless screw Q, Fig. 5, is inserted. This aperture is one half in the tablet and the other half in the chuck, as is more plainly shown at P, Fig. 6. This semicircular cavity P in the chuck must extend quite round its periphery and must be furnished with teeth on its concave surface suitable to work into the endless screw. When this kind of chuck is used, the adjoining margins of the chucks and tablets must be graduated exactly alike for the purpose of enabling the workman to place the chucks in or to shift them to exactly the same position with regard to each other. This manner of shifting the chucks will be found most convenient and expeditious for many kinds of work, while in other kinds of work the form first described will be the best.

I do not claim the horizontal movements of the carriages as herein described in themselves, (they having been before known and used,) but only in combination with the other parts and movements of the machine; nor do I claim the using of a pattern or the operation of the cutting-tool and guide as such, nor any other part which has been heretofore used; but What I do claim as my invention, and desire to secure by Letters Patent, is—

1. The circular adjustable chucks, by means of which the cutting-tool can be made to operate not only on a greater variety of surface, but also with much more accuracy and dispatch as well as convenience.

2. The manner in which I have arranged and combined the several parts and movements of the machine, to wit: combining the two lateral motions of the carriages at right angles with the motion to incline the tablets, and the manner of shifting the chucks in the course of the operation, so as to bring all parts of the surface (except the bottom) of the block or material to be carved equally within the operation of the cutting-tool, while the cutting-tool is governed by the guide working on the pattern, thereby enabling the workman to carve five sides of a cubical figure, and consequently to carve all parts (except the bottom) of irregular figures generally by the machine, operating substantially as herein described.

HEZEKIAH AUGUR.

Witnesses:
 HENRY G. LEWIS,
 R. FITZGERALD.